United States Patent [19]

Jensen et al.

[11] Patent Number: 4,889,660
[45] Date of Patent: Dec. 26, 1989

[54] RADIOLUMINESCENT LIGHT SOURCES, TRITIUM CONTAINING POLYMERS, AND METHODS FOR PRODUCING THE SAME

[75] Inventors: George A. Jensen; David A. Nelson; Peter M. Molton, all of Richland, Wash.

[73] Assignee: Battelle Memorial Institute, Richland, Wash.

[21] Appl. No.: 138,517

[22] Filed: Dec. 24, 1987

[51] Int. Cl.⁴ .......................... G21G 4/00; F21K 2/00; C09K 11/06; C09K 11/08
[52] U.S. Cl. .................... 252/646; 250/459.1; 250/462.1; 252/301.17; 252/301.33; 252/301.35; 252/301.36; 252/644; 252/301.16
[58] Field of Search .............. 252/646, 301.17, 301.33, 252/301.35, 301.36; 250/459.1, 462.1, 493; 313/54, 92, 108

[56] References Cited

U.S. PATENT DOCUMENTS

| | | | |
|---|---|---|---|
| 2,749,251 | 6/1956 | Shapiro | 252/646 |
| 3,033,797 | 5/1962 | DeLeo et al. | 252/646 |
| 3,210,288 | 10/1965 | Evans et al. | 252/646 |
| 3,224,978 | 12/1965 | MacHutchin et al. | 252/646 |
| 3,238,139 | 3/1966 | Fischer et al. | 252/646 |
| 3,325,420 | 6/1967 | Futterknecht et al. | 252/646 |
| 3,342,743 | 9/1967 | Rosenberg | 252/646 |
| 3,366,573 | 1/1968 | Feuer | 252/646 |
| 3,382,184 | 5/1968 | Goodman | 252/646 |
| 3,809,687 | 5/1974 | Allison, Jr. et al. | 252/646 |
| 3,889,124 | 6/1975 | Yamamoto et al. | 250/493 |

FOREIGN PATENT DOCUMENTS

| | | |
|---|---|---|
| 476091 | 9/1969 | Switzerland . |
| 869698 | 7/1961 | United Kingdom . |
| 874791 | 8/1961 | United Kingdom . |
| 991017 | 5/1965 | United Kingdom . |
| 1002426 | 8/1965 | United Kingdom . |

OTHER PUBLICATIONS

Cacace, F. 1975, B. Decay of Tritiated Molecules as a Tool For Studying Ion–Molecule Reactions NATO Study Adv. Inst. Serv. B.6., (Interact. Ins. Mol.), pp. 527–540.

Berstein et al., "Tritiation of Multiple Bonds–Synthesis of Tritiated Styrene", *Journal of American Chemical Society*, vol. 74, 5763–5764, (1952).

Peters J. M., and M. Guillaume, 1969b. "Microsynthese du Parapolyphenyle Tritie a Tres Haute Activite Specifique", *J. Labeled Compounds*, 5, 72–79.

Burfield, D. R. and C. M. Savariar, 1984, "Synthesis of Tritium Labelled Monomers and Polymers", *Eur. Polymer J.*, 20, 343–347.

*Primary Examiner*—Howard J. Locker
*Attorney, Agent, or Firm*—Wells, St. John & Roberts

[57] ABSTRACT

A radioluminescent light source comprises a solid mixture of a phosphorescent substance and a tritiated polymer. The solid mixture forms a solid mass having length, width, and thickness dimensions, and is capable of self-support. In one aspect of the invention, the phosphorescent substance comprises solid phosphor particles supported or surrounded within a solid matix by a tritium containing polymer. The tritium containing polymer comprises a polymer backbone which is essentially void of tritium.

12 Claims, 1 Drawing Sheet

RADIOLUMINESCENT LIGHT SOURCES, TRITIUM CONTAINING POLYMERS, AND METHODS FOR PRODUCING THE SAME

This invention was made with government support under Contract No. DE-AC06-76RLO 1830 awarded by the U.S. Department of Energy. The government has certain rights in the invention.

TECHNICAL FIELD

The invention relates primarily to improvements in radioluminescent light sources which utilize the radioactive decay of tritium and which are classified in Class 250, Class 362, and Class 252 Subclass 646.

BACKGROUND OF THE INVENTION

Radioisotopes have been used for a number of years to excite phosphors into luminescing to produce visible light. One example of such a use is the common watch or alarm clock having a dial that is visible in the dark. The clock hands and numeration points around the dial are coated with a paint containing a radioisotope which excites a phosphor to produce visible light. The phosphors will continue to produce light visible in darkness as long as the radioactive decay or activity of the radioisotope is sufficient to excite the phosphors.

It has long been recognized that it would be desirable to produce much brighter light sources using radioluminescence, if such could be done safely and economically. Such lights could be used, for example, as airfield runway edge and threshold markers. Conventional airfield lights consume large amounts of electrical power and are not practical in remote areas. A radioluminscent light would have its own inherent power source that could last for many years with virtually no maintenance, except perhaps for periodic cleaning of the light surface. Such concepts could also be employed to produce escape and exit signs in buildings which must be viewable when electrical power is interrupted. The present use of a back-up battery system for supplying power to such lights could be eliminated by employing a safe and sufficiently bright radioluminescent light source.

Further, it would be desirable to use radioluminescent sources that produce electromagnetic radiation in the infrared region of the light spectrum. This would provide a simulated thermal source which might have application in military and counter-intelligence operations.

Prior art research and development efforts regarding high intensity radioluminescent light sources have produced less than desirable brightness. Much of the recent research and development has focused upon light sources which employ the radioactive decay of the hydrogen isotope tritium. One such light source, produced by Oak Ridge National Laboratories, employs inorganic phosphors which are activated by the beta particles (electrons) produced during decay of tritium gas. The light source employs an elongated, closed tube approximately 10 inches long and 1 inch wide. The volume of the tube cavity is 14.4 cm$^3$. A phosphor is coated about the inner tube surface, and the tube loaded with tritium gas. The volume of tritium in the tube produces a radioactive decay rate of 50 Ci. Such a light source is reportedly capable of producing light at the rate of 1.0 ft-Lambert, which corresponds to 2.0 micro-Lamberts per milliCurie. Under optimum conditions in near complete darkness, such a light source would be expected to be viewable by the unaided human eye from a distance of approximately 1 to 1.5 miles.

Although this light source is quite functional, it does present a theoretical hazard due to the gaseous tritium enclosed within the system. Were such a light fractured, the gaseous tritium would undoubtedly escape into the atmosphere. Additionally, many radioluminescent paints that utilize tritium decay leak tritium to the environment, which poses a hazard. Furthermore, it would be desirable to increase the amount of luminosity produced for a given amount of radioactive decay to both maximize efficiency and minimize the amount of radioactive decay necessary to produce a given intensity light for safety reasons.

BRIEF DESCRIPTION OF THE DRAWINGS

The preferred embodiment of the invention is illustrated in the accompanying drawings, in which.

DETAILED DESCRIPTION OF PREFERRED EMBODIMENTS

The following disclosure of the invention is submitted in compliance with the constitutional purpose of the Patent Laws "to promote the progress of science and useful arts" (Article 1, Section 8).

It has been discovered that improved radioluminescent light sources of significantly increased luminosity can be generated by creating a solid mixture of a phosphorescent substance and a tritium containing polymer. The solid mixture forms a solid mass having length, width, and thickness dimensions and is capable of self-support, unlike radioluminescent paints. In one aspect of the invention, the phosphorescent substance comprises solid phosphor particles, such as inorganic phosphor particles. In this embodiment, the solid mixture is comprised of a solid matrix of phosphor particles surrounded or supported within the tritium containing polymer. In another aspect of the invention, the phosphorescent substance comprises an organic phosphor at least partially dissolved within a tritium containing polymer. Stability, efficiency, and safety of light sources constructed in accordance with the invention are significantly enhanced over prior art light sources, and capable of attaining significantly increased brightness.

Figure 1:
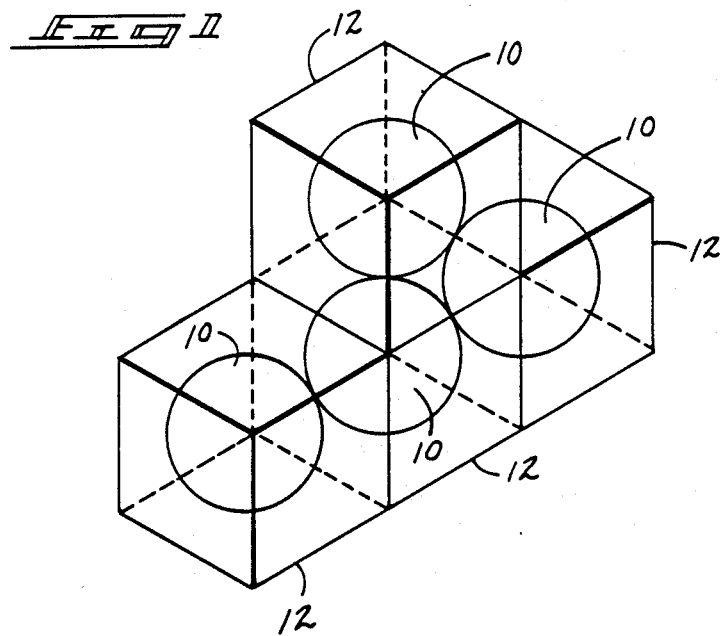
FIG. 1 is a diagramatic view of a portion of the solid matrix of a radioluminescent light source in accordance with the invention.

FIG. 1 illustrates a portion of a solid matrix of solid inorganic phosphor particles having maximized phosphor loading within a given tritiated polymer. In such a matrix, individual phosphor particles are represented by an array of tightly-packed, surface-contacting spheres 10. The phosphor particles are represented as theoretical spheres although their shape will not be exactly spherical. FIG. 1 illustrates a portion of such a solid matrix showing a limited number of contacting spheres 10 for clarity. Each sphere 10 can be considered as being retained within a cube 12 having length-width-height dimensions equal to the diameter of sphere 10. Each cube, containing a sphere, would be immediately adjacent another cube against each of its six sides, with the spheres in adjacent cubes contacting one another. The maximum theoretical loading of a tritiated polymer relative to the tightly packed spheres (particles) would be represented by the void spaces between the spheres. For a given cube, this void space would be represented by the volume of the cube minus the volume of the sphere as follows:

$$\begin{aligned} \text{Void space} &= V_{cube} - V_{sphere} \\ &= 2r^3 - \frac{4}{3}(pi)r^3 \\ &= r^3\left[(2^3) - \frac{4}{3}(pi)\right] \\ &= 3.811r^3 \end{aligned}$$

The volume percentage of the void space relative to the cube volume is represented by the volume of the void space divided by the cube volume which equals $3.811r^3/2r^3$, or 47.6%. The remaining 52.4% of the cube volume is occupied by the phosphor particle spheres. The percentages are applicable to the entire matrix as each cube face is shared by two adjacent cubes.

Lights of the highest theoretical efficiency would be obtainable by maximizing phosphor loading to approach this dense sphere-contacting matrix to minimize void space, accompanied by maximizing tritium content within the void space. Tritium loading of a polymer should preferably be to an extent to produce a radioactive decay of at least 265 Ci/gm of polymer. The weight ratio of tritium content to phosphor content in the matrix for inorganic phosphor particles should also preferably be from 0.075:1 to 0.30:1 to maximize luminosity output. Most preferably, at least 20% of the available hydrogen sites within the polymer will be occupied by tritium.

The particular polymer and polymer-to-phosphor mix are also preferably combined to provide a translucent or transparent end product. This is preferred to enable light to escape from the central portions of the solid body forming the light source. Were the resultant product opaque, only the outer surfaces of such body would produce visible or perceivable luminescence which would significantly affect the efficiency of the source. Accordingly, with certain phosphors and polymers, maximized phosphor and tritium loading might produce an opaque source which would reduce efficiency. Phosphor loading to produce desired translucency or transparency should be between 30 and 80 weight percent phosphor in the solid solution. Maximum light generation is expected to be obtainable by forming the light source into a thin sheet, for example 20 to 30 microns thick.

A light source constructed of such a solid mixture has numerous advantages. For example, maximizing tritium loading of the polymer and completely filling the void space produces a higher concentration of available tritium for energizing each phosphor particle. Additionally, surrounding the phosphor particles with the tritium minimizes the distance that must be travelled by the beta particles before contacting a phosphor particle. This will produce significantly improved efficiency over prior art light source bodies where phosphor films are merely placed in the vicinity of a radioactive isotope.

It is generally recognized that the effects of a beta particle will be significant for at least 5 microns in conventional ZnS phosphors. It has been shown that beta particles will travel between 1 and 5 microns through solid polymers. The maximum distance of travel for any beta particle in the theoretical maximum phosphor particle loaded matrix would be represented by travel from the corner of a cube 12 to the center of a sphere 10 contained by the cube. This, using simple pythagorean geometry, is 1.414 times the radius of the sphere, or rather, the phosphor particle. Phosphor particle size should be between 0.1 micron and 10 microns in diameter to maximize the volume of individual phosphor particles which is exposed to the beta particle in the maximum loaded phosphor particle matrix. Phosphor particles greater than 10 microns in size could result in significantly less luminosity output. This is because the center of such particles would be displaced from the particle surface a significant distance more than the maximum travel distance of beta particles through phosphor particles. In other words, the central portions of large phosphor particles would be reached and energized by few if any beta particles.

Less than maximum phosphor loading would of course also lengthen the maximum travel distance for distant beta particles to energize a phosphor particle. This also would correspond to reduced efficiency as a lesser amount of the radioactive decay in a given solid matrix would reach phosphor particles. This leaves beta particles more free to disrupt or break the polymer. Additionally, the amount of phosphor particles available to luminesce is less in a reduced phosphor loaded matrix which also would effect efficiency. Furthermore, less absorption of radioactive decay by phosphor particles results in greater tritium escape to the environment.

Nevertheless, in spite of potential difficulties in achieving maximum loadings while maintaining transparency or translucency, it is anticipated that a highly phosphor loaded matrix of particles sized between 0.1 microns and 10 microns will enable at least 90% absorption of available beta particles by the phosphor particles. This will enhance stability of the final matrix and enable production of light sources having luminosities of $20 \times 10^{-6}$ micro-Lamberts/milliCi and even greater. The greater the phosphor loading and tritium loading of the polymer, the greater the anticipated output as long as the finished matrix is not opaque.

The above described light source employs solid inorganic phosphor particles suspended or surrounded by a tritiated polymer in a matrix. As previously described, the invention could also be practiced by employing organic phosphors, most of which are at least partially soluble within the tritium containing polymers when in liquid form. Examples of such organic phosphors would be 9,10-diphenylanthracene and 4-fluoranthene. Phosphors could also be employed which luminesce in the infrared region of the electromagnetic spectrum, without departing from the principles and scope of the invention.

In the prior art, a wide range of tritiated polymers have been employed in producing radioluminescent paints. Many of these polymers and others should be usable in producing the light sources described above without departing from the principles and scope of the invention. None of the prior art suggests a self-supportable solid mass of material that radioluminesces with the improved efficiencies we can obtain.

We have also invented new tritiated polymers, and methods for producing tritiated polymers, that are usable in creating the above-identified light sources, as well as usable with other radioluminescent light sources. In one aspect of this part of the invention, the polymer comprises a plurality of interconnected monomers a significant number of which have a radical (inorganic or organic) bonded to at least one cyclic compound. The radicals of adjacent monomers are bonded to one another to interconnect the monomers and form the polymer backbone. The cyclic compound has a plurality of hydrogen atoms extending from the cyclic ring. At least one of the hydrogen atoms extending from a significant number of the cyclic rings consists of the tritium isotope of hydrogen instead of the common protium isotope. The significant number of tritium substitutions preferably provides a radioactive decay of at least 265 Ci/gm of polymer.

The cyclic compound can be aliphatic, aromatic, or heterocyclic. Where the cyclic compound is aliphatic such as cyclohexane, the theoretical maximum tritium loading around the cyclic ring would be 11 tritium atoms. The remaining bond of the ring would bond with the backbone radical. Likewise, where the cyclic compound is aromatic, the maximum tritium loading would be 5 tritium atoms about each aromatic ring. Preferably, a majority of the hydrogen atoms extending from each cyclic ring will consist of tritium to maximize available tritium decay for energizing phosphors. Also preferably, each of the monomer units will include a cyclic compound to maximize the available locations in the polymer about a cyclic compound for tritium substitution. For example, a polymer wherein each monomer includes a cyclohexane group having 11 substituted tritium atoms is expected to provide a radioactive decay of 2,200 Ci/gm of polymer.

Tritium loading about the cyclic ring or other pendant group has been discovered to be preferred to tritium loading of the polymer backbone to improve stability of the polymer. Tritium substitution of the backbone can result in polymer disruption resulting from the beta particles.

A method has also been developed to substitute tritium about aromatic rings within a polymer structure. The method principally substitutes the tritium at the ortho and para positions providing three tritium substitutions about the ring per each monomer unit. Examples of such tritium substituted polymers where the polymer is polystyrene are described below. Of course other substitution methods might be employed to obtain tritium substitution about the aromatic ring without departing from the principles and scope of the non-method aspects of this invention.

The inventive method comprises combining a polymer with a solvent and Lewis acid catalyst to produce a reaction solution. A significant number of the polymer monomers includes at least one aromatic compound having a plurality of hydrogen (protium) atoms extending from the aromatic ring. A tritium containing compound, preferably a tritium-halide, is added to the reaction solution, preferably under pressure. This causes substitution of tritium atoms for the protium atoms extending from the aromatic ring of the monomers.

The Lewis acid catalysts are preferably weak and are selected from the group consisting of $TiCl_4$, $CuCl_2$, $SbCl_5$, $FeCl_3$. Strong Lewis acid catalysts might also be usable, such as $AlCl_3$, but are not preferred as cross-linking of the polymer will result. This is not desirable since cross-linked polymers tend to lose solubility in normal solvents and are not readily processed into a self-supporting mass such as a solid film or sheet.

Preferred solvents are dichloromethane and carbon tetrachloride. Additionally, tritium substitution is maximized by conducting the reaction at elevated pressures. The reaction tends to substitute tritium at the ortho and para positions.

EXAMPLE 1

Linear polystyrene in the amount of 1 gm (0.0096 mole) was dissolved in 50 ml of dichloromethane. $TiCl_4$ in the amount of 1.82 gm (0.0096 mole) was added to produce a reaction solution. The contents of this solution were contained within a 75 ml steel autoclave. The autoclave was pressured to 125 psia with deuterium chloride gas (DCl) from a cylinder. (Tritium was not employed in this example to minimize experimental hazards and eliminate the protocol required for using radioactive substances. The basic chemistry of deuterium and tritium are essentially identical and will lead to the same results.) The temperature of the autoclave was held at 25° C., and the reaction solution maintained under such conditions without shaking for three days. After pressure release, the contents of the reaction were poured into a vessel containing 200 ml of methanol. The polymer precipitated from the solution. The polymer was redissolved in dichloromethane and reprecipitated with methanol to confirm that the polymer was still linear and had not undergone crosslinking. To examine deuterium substitution, the sample was first pyrolyzed at 600° C. at 0.5 torr pressure to break the polymer. The monomer was collected in a dry-ice trap. It was examined using gas chromatography and mass spectrometry techniques to determine the amount of deuterium attached to the styrene. Such techniques illustrated that the polymer contained more than three deuterium atoms per aromatic group in each monomer unit. Such a polymer substituted with tritium as opposed to deuterium should exhibit a radioactivity of greater than 800 Ci/gm.

EXAMPLE 2

Linear polystyrene in the amount of 1 gm (0.0096 mole) was dissolved in 50 ml of dichloromethane. $TiCl_4$ in the amount of 1.82 gm (0.0096 mole) was added to produce a reaction solution. DCl was sparged into a reaction vessel from a generator containing 2.64 gm of $TiCl_4$, with a dropwise addition of 4.5 gm of $D_2O$. The DCl addition was performed over a two hour period. The reaction mixture was stirred, for 14 hours at 25° C. and atmospheric pressure. After this time, the reaction mixture was poured into a vessel containing 200 ml of methanol. The precipitated polymer was redissolved into 50 ml of dichloromethane and reprecipitated with methanol. This confirmed, as in Example 1, that the polymer was still linear and had not undergone crosslinking. Gas chromatography and mass spectrometry confirmed that the polymer contained one deuterium atom in six of every ten monomer units. Such a polymer substituted with tritium would be expected to exhibit a radioactivity of 160 Ci/gm. One tritium substitution per aromatic unit wherein each monomer contained one aromatic would be expected to produce 265 Ci/gm.

Inorganic phosphor incorporation to produce a solid, self-supportable matrix can be performed using dissolved polymer techniques. For example, phosphor particles are added to a liquid solution of polymer dissolved within a polymer solvent. The combined mixture is stirred to insure complete dispersal of particles throughout the solution. The stirred solution can then be poured onto a surface or cast into a desired shape, and permitted to dry into a solid, self-supportable mass.

The mass is preferably formed into a thin film, as previously described, to maximize luminescent output from the center volume of the mass.

Organic phosphor incorporation to produce a solid, self-supportable light source can be performed using similar technique. Organic phosphors tend to dissolve with the polymer in the polymer solvent, whereas inorganic phosphors remain as suspended particles in the finished solid light source. Different phosphors or combination of phosphors would of course be usable to produce a desired luminescent output.

Figure 2:
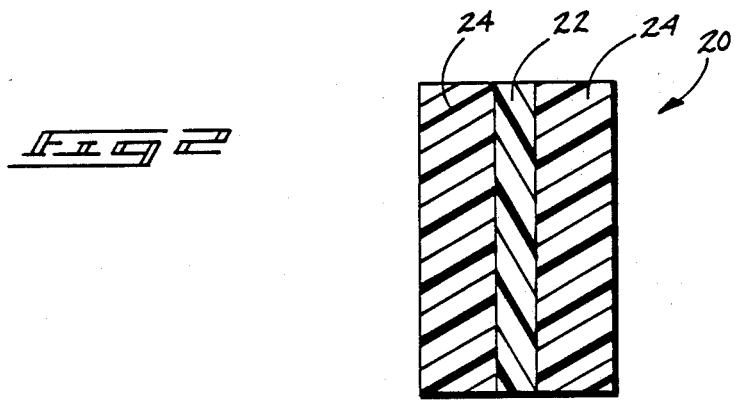
FIG. 2 is a sectional view of a radioluminescent light source in accordance with the invention.

A tritium substituted polymer and associated phosphor can be employed to produce a light source such as shown in FIG. 2. There shown is a light source 20 which includes a solid, self-supportable mass 22 protected by transparent layers of polycarbonate sheets 24. Although sandwiched between a pair of polycarbonate sheets 24, the solid mass 22 would be self-supportable, unlike a layer of radioluminescent paint, were the polycarbonate sheets not present.

In compliance with the statute, the invention has been described in language more or less specific as to structural and methodical features. It is to be understood, however, that the invention is not limited to the specific features shown and described, since the means and construction herein disclosed comprise preferred forms of putting the invention into effect. The invention is, therefore, claimed in any of its forms or modifications within the proper scope of the appended claims, appropriately interpreted in accordance with the doctrine of equivalents.

We claim:

1. A radioluminescent light source comprising:
   a phosphorescent substance present in an amount from 30 to 80 weight percent of the light source: and
   a tritiated solid polymer comprising:
   a plurality of interconnected monomers, a significant number of the monomers including a radical bonded with at least one cyclic compound, the cyclic compound having a plurality of hydrogen atoms extending from its cyclic ring, the radicals of adjacent monomers being bonded to one another to interconnect the monomers and form a polymer backbone; and
   at least one of said hydrogen atoms extending from a significant number of the cyclic rings consisting of tritium, such significant number of cyclic rings being sufficient to produce a radioactive decay of the tritiated solid polymer of at least about 265 Ci/gm of polymer and the light source having a visible luminosity output of at least 2.6 micro-Lamberts per millicurie, the polymer backbone being substantially void of tritium to produce a polymer which is stable and self supporting upon tritium decay.

2. The light source of claim 1 wherein the phosphorescent substance is inorganic and comprises solid phosphor particles having a size from 0.1 micrometers to 10 micrometers in diameter, the light source comprising a solid matrix of phosphor particles surrounded by the tritiated solid polymer.

3. The light source of claim 1 wherein the tritiated solid polymer comprises polystyrene having at least three tritium atoms bonded to the aromatic rings of the monomer units.

4. The radioluminescent light source of claim 1 wherein the phosphorescent substance is organic and comprises an organic solid solution which is at least partially dissolved within the tritiated solid polymer.

5. The light source of claim 1 wherein the cyclic compound is aliphatic.

6. The light source of claim 1 wherein the cyclic compound is heterocyclic.

7. The light source of claim 1 wherein the cyclic compound is aromatic.

8. The light source of claim 7 wherein tritium is present at either the ortho or para positions around the aromatic ring.

9. The light source of claim 7 wherein tritium is present at the meta positions around the aromatic ring.

10. The light source of claim 7 wherein tritium is present at both the ortho and para positions around the aromatic ring.

11. The light source of claim 7 wherein the cyclic compound comprises styrene.

12. A radioluminescent light source comprising a phosphorescent substance and a tritiated solid polymer, the tritiated solid polymer comprising a plurality of interconnected monomers, a significant number of the monomers including a radical containing two or more carbon atoms, with the radical being bonded with at least one pendant group, the pendant group including a plurality of hydrogen atoms, the radicals of adjacent monomers being bonded to one another to interconnect the monomers and form a polymer backbone;
   at least one of said hydrogen atoms extending from a significant number of the pendant groups consisting of tritium, such significant number of pendant groups being sufficient to produce a radioactive decay of the tritiated solid polymer of at least about 265 Ci/gm of polymer; and
   the polymer backbone being substantially void of tritium to produce a polymer which is stable and self supporting upon tritium decay;
   the light source having a visible luminosity output of at least 2.6 micro-Lamberts per millicurie.

* * * * *